United States Patent
Aoyama et al.

(10) Patent No.: US 7,653,768 B2
(45) Date of Patent: Jan. 26, 2010

(54) METHOD, SYSTEM, AND PROGRAM FOR MASTER AND SLAVE UNITS CONNECTED IN DAISY CHAIN WHEREIN APPENDED ERROR CODE IS TRANSFERRED BETWEEN THE UNITS

(75) Inventors: Kazunari Aoyama, Yamanashi (JP); Kunitaka Komaki, Yamanashi (JP); Masahiro Miura, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 200 days.

(21) Appl. No.: 11/844,157

(22) Filed: Aug. 23, 2007

(65) Prior Publication Data

US 2008/0052417 A1    Feb. 28, 2008

(30) Foreign Application Priority Data

Aug. 24, 2006    (JP) ................................. 2006-228053

(51) Int. Cl.
*G06F 3/00* (2006.01)

(52) U.S. Cl. ........................... 710/100; 710/1; 710/300; 714/785; 714/798; 714/781; 714/708

(58) Field of Classification Search ................. 710/1, 710/100, 300; 714/785, 798, 781, 708
See application file for complete search history.

(56) References Cited

U.S. PATENT DOCUMENTS 7,181,657 B2 *   2/2007   Soga et al. .................. 714/704
7,474,677 B2 *   1/2009   Trott ........................... 370/473
2004/0153939 A1 *   8/2004   Aoyama et al. .............. 714/746

FOREIGN PATENT DOCUMENTS

| JP | 10-13394 A | 1/1998 |
| JP | 2001-94626 A | 4/2001 |
| JP | 2002344453 A | 11/2002 |
| JP | 2002366536 A | 12/2002 |
| JP | 2006094302 A | 4/2006 |

OTHER PUBLICATIONS

Notice of Reasons for Rejection of Patent Application No. 2006-228053 mailed Apr. 22, 2008.

* cited by examiner

*Primary Examiner*—Tammara Peyton
(74) *Attorney, Agent, or Firm*—Lowe Hauptman Ham & Berner, LLP

(57) ABSTRACT

A data transfer method for connecting a master unit on an upstream side and a plurality of slave units on an downstream side in series with serial bus by a daisy chain system and transferring data having an appended error check code or error correction code between a data transmitter and a data receiver, the data transfer method including: transferring the data flowing in the serial bus in the slave unit from the data transmitter to the data receiver without performing an error check or error correction; performing an error check of the data in a circuit provided in the slave unit aside from a circuit in which the data flow; and informing a result of the error check to the master unit individually by the slave unit, which has performed the error check of the data.

5 Claims, 9 Drawing Sheets

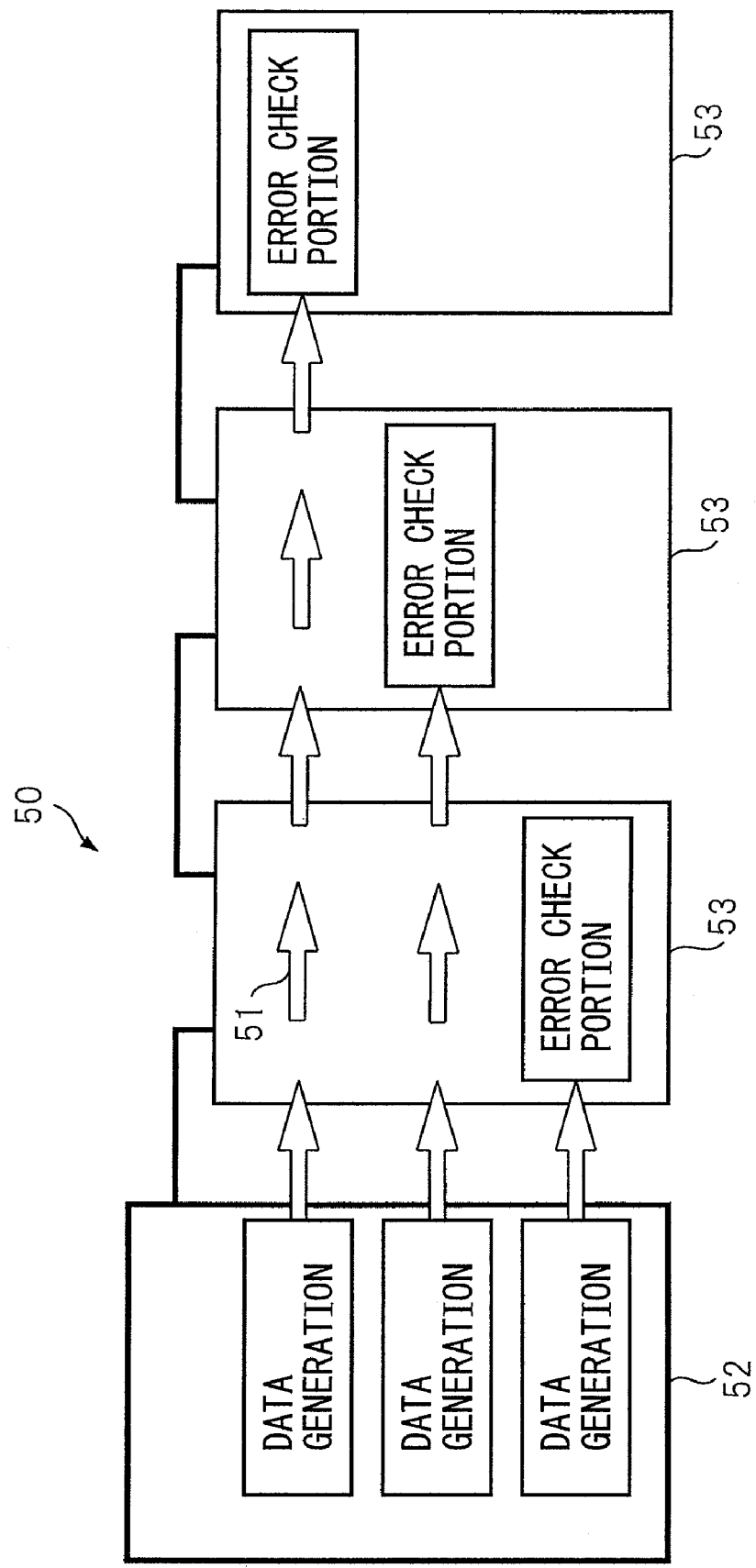

METHOD, SYSTEM, AND PROGRAM FOR MASTER AND SLAVE UNITS CONNECTED IN DAISY CHAIN WHEREIN APPENDED ERROR CODE IS TRANSFERRED BETWEEN THE UNITS

CROSS REFERENCE TO RELATED APPLICATIONS

The present application claims priority based on Japanese Patent Application No. 2006-228053 filed on Aug. 24, 2006, the disclosure of which is incorporated herein in its entirety by reference.

BACKGROUND OF THE INVENTION

1. Field of the Invention

The present invention relates to a data transfer method and a data transfer apparatus for making a robot perform desired operations in various driving axes in synchronism with each other.

2. Description of the Related Art

Generally, as a data transfer method for operating various axes of a machine tool or a robot in synchronism with each other, there is a known data transfer method in which a master unit, such as a controller situated on an upstream side and slave units, such as a plurality of servo amplifiers situated on a downstream side are connected in series by a daisy chain system with a serial bus, and data having an appended error check code or data having an appended error correction code are transferred from the upstream side to the downstream side. In a machine tool or the like having three mutually orthogonal axes, when a current position of a feeding axis is to be detected, the positions of the other axes must also be detected in synchronism. When one axis is to be moved, synchronism with other axes is also required.

Japanese Patent Publication No. H10-13394 (Patent Reference 1) discloses an example of such a data transfer method. In this example, a plurality of servo amplifiers are connected in series via communication lines such as optical cables to a numerical control apparatus by a daisy chain system. The numerical control apparatus transmits a position command or the like via the communication lines to various servo amplifiers, and various servo amplifiers receive the position command or the like. Each servo amplifier drives a servo motor in accordance with the received position command or the like. The control apparatus situated on the upstream side is adapted to receive feedback signals from slave units which include the servo amplifiers and servo motors.

Also, Japanese Patent Publication No. 2001-94626 (Patent Reference 2) discloses another example of a data transfer method. In this example, data can be transferred at high speed between a plurality of slave units, which are connected to a master unit. In other words, the data transfer apparatus is provided with a communication rank control portion and uses control lines provided separately in addition to a data communication line to determine whether or not the communication data should be transmitted.

However, with such a data transfer method, there is a problem that, when data having the appended error check code or data having the appended error correction code are to be transmitted from downstream individual slave units to the upstream side, the data transfer speed tends to be lowered. For example, in Patent Reference 2, a method is disclosed wherein a unit connected by a daisy chain system checks for errors in data received from another unit connected on the downstream side. With this method, data cannot be transferred to the upstream side until all of the data has been received, and this makes it impossible to transfer data at high speed. Therefore, the present applicant has proposed to increase data transfer speed by transferring data 51 having the appended error check code or error correction code without performing the error check of the data having the appended error check code or error correction code, as shown in FIG. 8. FIG. 9 is a view showing an example of another case where data are transferred in an opposite direction, i,e, from the upstream side to the downstream side.

However, in the example shown in FIG. 8, there is a problem in that error information from individual slave units 53 cannot be obtained from data having the appended error check code or error correction code received by the master unit 52, and it is impossible to identify the slave unit 53 where the error has occurred. In the example shown in FIG. 9, there is also a problem in that error information cannot be obtained from data 51 having the appended error check code or error correction code transmitted by the master unit 52 and received by a receiving slave unit 53, connected to the serial bus from the data transmitter to the data receiver, and it is impossible to identify the slave unit where the error has occurred. Therefore, when performing maintenance on the machine tool or the robot which is shut down by an error in control data caused by noise or fault, it takes a lot of time to detect the noise source or locate the fault, and maintenance cost may be increased due to unnecessary replacement of parts.

SUMMARY OF THE INVENTION

In view of the above-described problem, it is an object of the present invention to provide a data transfer method and a data transfer apparatus that is capable of performing high speed data transfer between slave units connected by a daisy chain system, and is capable of identifying the slave unit where a data error has occurred.

In order to attain the above object, in accordance with an aspect of the present invention, there is provided a data transfer method for connecting a master unit on an upstream side and a plurality of slave units on a downstream side in series with a serial bus by a daisy chain system, and transferring data having an appended error check code or error correction code between a data transmitter and a data receiver, the data transfer method comprising: transferring the data flowing in the serial bus in the slave unit from the data transmitter to the data receiver without performing an error check or error correction of the data; performing the error check of the data in a circuit provided in the slave unit aside from a circuit flowing the data; and informing a result of the error check to the master unit individually by the slave unit which has performed the error check of the data.

In accordance with this invention, since data with error check code or error correction code are transferred from the data transmitter to the data receiver without performing error check at the slave unit, it is possible to transfer data at high speed between a plurality of slave units connected to a daisy chain. Since error check of data with error check code or error correction code is performed in a separate circuit aside from the circuit through which the data with error check code or error correction code flow in the slave unit, the slave unit in which the error has occurred can be identified without lowering the data transfer speed of data transferred from the data transmitter to the data receiver. Since the result of the error check is individually sent to the master unit, the slave unit in which the error has occurred can be recognized via the master unit. Therefore, data can be transferred at high speed, the slave unit in which the error has occurred can be identified so that maintenance for the machine tool or the robot can be improved.

In accordance with an aspect of the present invention, there is provided a data transfer apparatus in which a master unit on an upstream side and a plurality of slave units on a downstream side are connected in series with a serial bus by a daisy chain system, and data having an appended error check code or error correction code are transferred between a data transmitter and a data receiver, the apparatus comprising: a data transfer portion for transferring the data flowing in the serial in slave unit bus from the data transmitter to said data receiver without performing an error check or error correction of the data; an error check portion for performing the error check of the data in a circuit provided in the slave unit aside from a circuit flowing the data; and an error informing portion for informing a result of the error check individually to the master unit in the slave unit which has the error check portion.

In accordance with this invention, the data with error check code or error correction code can be transferred by the data transfer portion without performing error check or error correction, high speed data transfer is possible between a plurality of slave units connected by the daisy chain system. Also, error check of the data with error check code or error correction code can be performed by the error check portion in a circuit provided in the slave unit aside from the circuit through which the data with error check code or error correction code flow, and the slave unit in which the error has occurred can be thereby identified. With the error informing portion with which said slave unit informs the result of the error check to the master unit, the slave unit in which the error has occurred can be recognized via the master unit. Therefore, data transfer can be carried out at high speed, the slave unit in which the error has occurred can be identified and maintenance on the machine tool or the robot can be improved.

BRIEF DESCRIPTION OF THE DRAWINGS

The above and other objects, features and advantages of the present invention will become more evident from following description of the preferred embodiments with reference to appended drawings, in which:

FIG. 9 is a view of the system construction of another example of prior art data transfer apparatus.

DETAILED DESCRIPTION OF THE INVENTION

Figure 1:
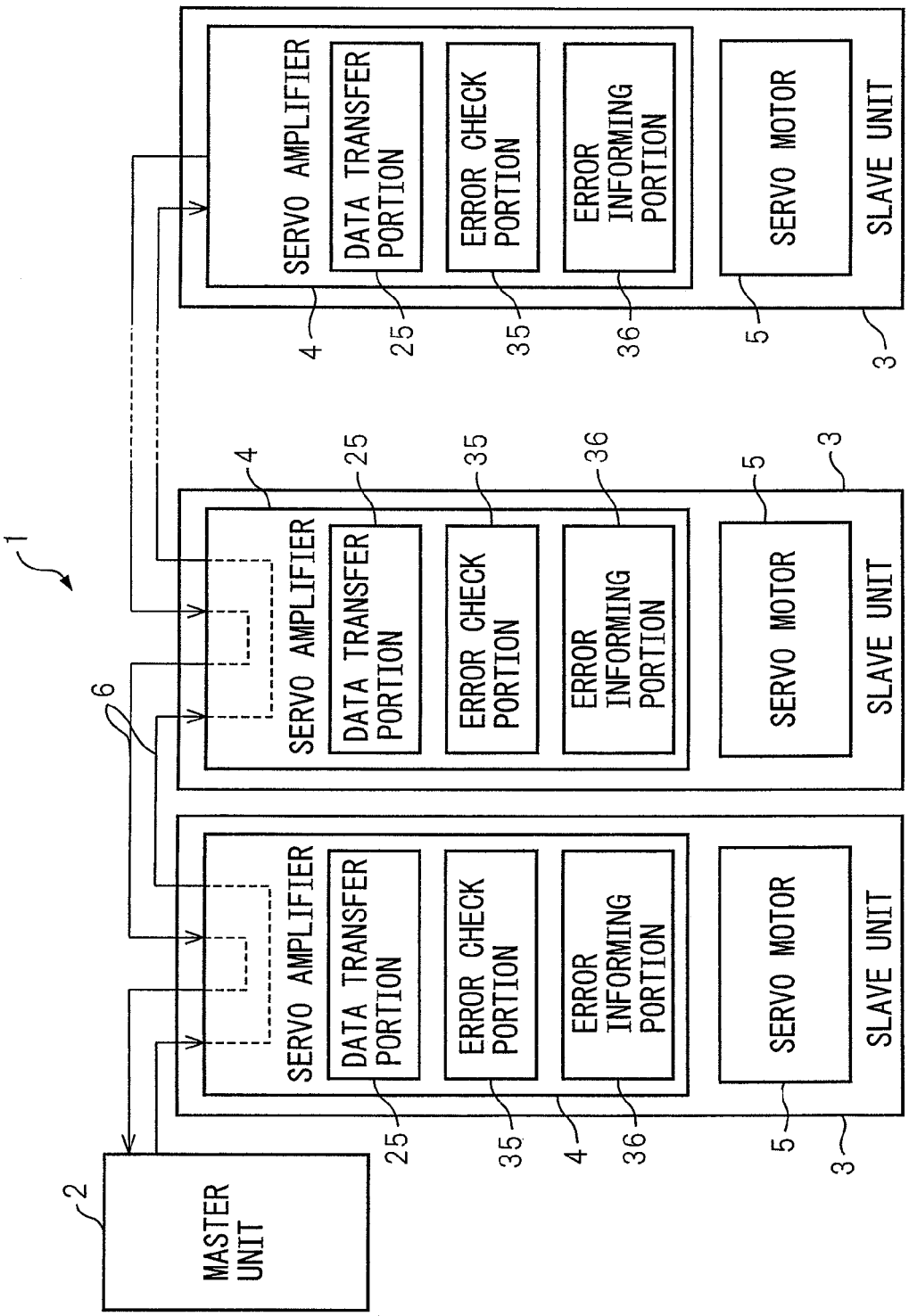
FIG. 1 is a view showing the construction of a data transfer apparatus according to a first embodiment of the present invention.

A data transfer apparatus according to the present invention will now be described in detail below with reference to the drawings. In the drawings, common constituents are denoted by the same reference numerals or symbols and duplicate explanation thereof is omitted.

As shown in FIG. 1, a data transfer apparatus 1 according to the present embodiment comprises a master unit 2 as a control apparatus situated on an upstream side and a plurality of slave units 3 situated on a downstream side. Each of the slave units 3 comprises a servo amplifier 4 and a servo motor 5. The master unit 2 and a plurality of slave units 3 are connected in series by a daisy chain system with serial bus, such that data can be transferred in both directions between the master unit 2 and the slave unit 3 on the downstream side. Thus, servo motors 5 are controlled and driven by the control data transferred from the master unit 2 to the slave units 3 (from upstream side to downstream side), and the state of the servo motors 5 is fed back by the feedback data transferred from the slave units 3 to the master unit 2 (from downstream side to upstream side).

Data having an error check code or error correction code are used as the transferred data, and are transferred in the form of packets. Therefore, reliability of data transferred is increased by using data having the error check code or error correction code.

Figure 2:
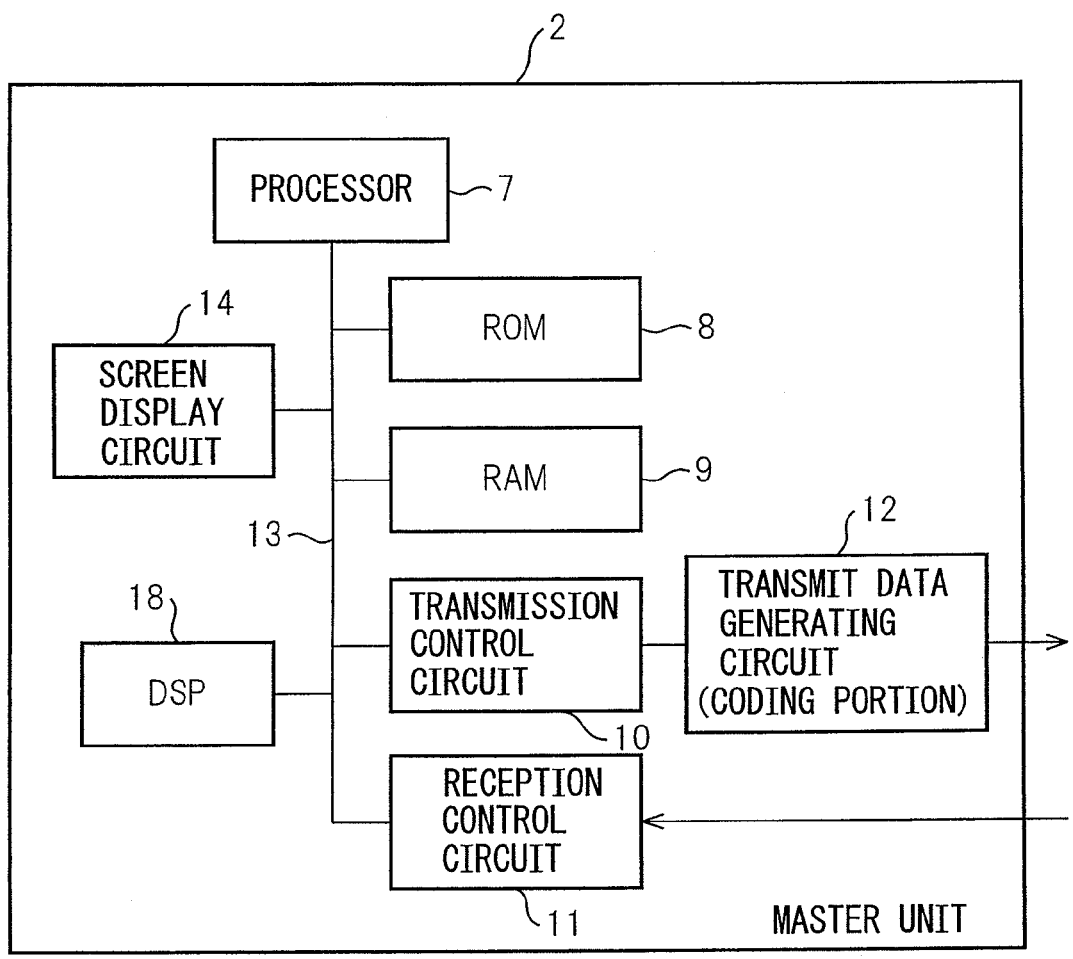
FIG. 2 is a view explaining the construction of a master unit.

As shown in FIG. 2, the master unit 2 is composed of a processor 7, a ROM 8, a RAM 9, a transmission control circuit 10, a reception control circuit 12, a DSP (Digital Signal Processor) 18, a screen display circuit 14 and the like. ROM 8, RAM 9, the transmission control circuit 10, the reception control circuit 11, DSP 18, the screen display circuit 14 are connected to the processor 7 via a system bus 13, and is the same circuit construction as in prior art, and is adapted to control the servo motors 5 based on the feedback data (feedback signal) in position loop control or in velocity loop control, as well as in circuit loop control based on the current feedback signal from the servo amplifiers 4.

An P/S converter (not shown) for converting a parallel signal to a serial signal is connected to the transmission control circuit 10, and sends out control data that is converted to a serial signal into a serial bus 6 as a signal line. Conversely, feedback data that is input from the slave units 3 via the serial bus 6 is input into an S/P converter (not shown) for converting a serial signal to a parallel signal, and is received by the reception control circuit 11.

A transmit data generating circuit 12 for generating control data by error check coding or error correction encoding process is provided between the transmission control circuit 10 and the P/S converter. Data generated in the transmit data generating circuit 12 is transmitted via the serial bus 6 to the slave units 3 on the downstream side. Data transfer from the upstream side to downstream side corresponds to a data transfer method according to a fourth embodiment of the present invention.

Figure 4:
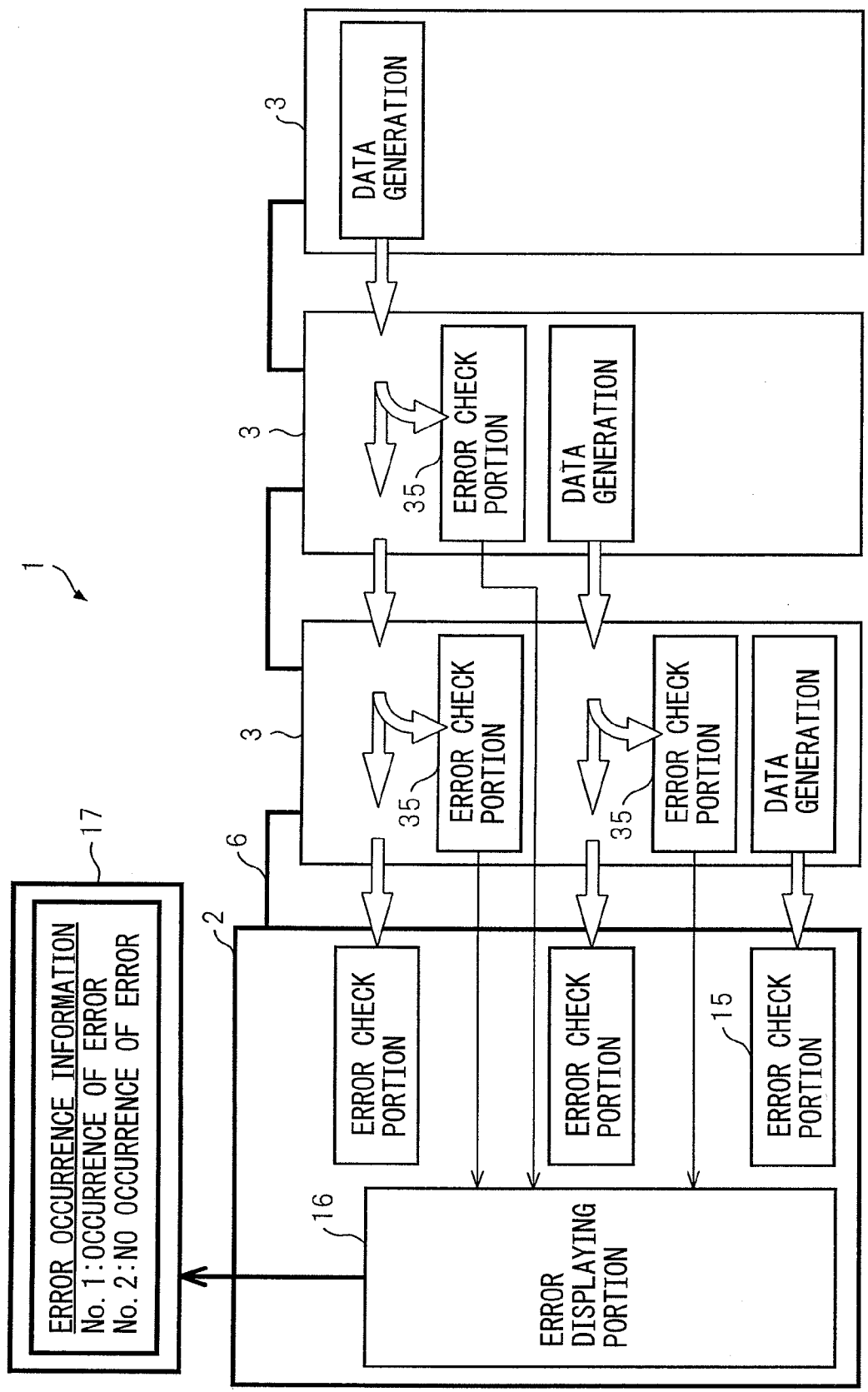
FIG. 4 is a schematic view showing the state of data flowing from downstream side to upstream side in the data transfer apparatus according to the first embodiment of the present invention.

As shown in FIG. 4, the reception control circuit 11 comprises an error check portion 15 for checking whether or not there is an error in the received data with error check code. Using the error check portion 15, the presence or absence of an error in the data transferred from the downstream side can be checked. The slave unit where the error has occurred can be specified by displaying the presence or absence of an error on the screen of a display 17 using an error displaying portion 16.

The error displaying portion 16 is composed of the master unit as shown in FIG. 2, and functions by the operation of the processor 7, ROM 8, RAM 9, the screen display circuit 14 and the like. The processor 7 examines the error check portion 15, operates the screen display circuit 14, and displays the presence or absence of an error on the screen of the display 17.

Figure 3:
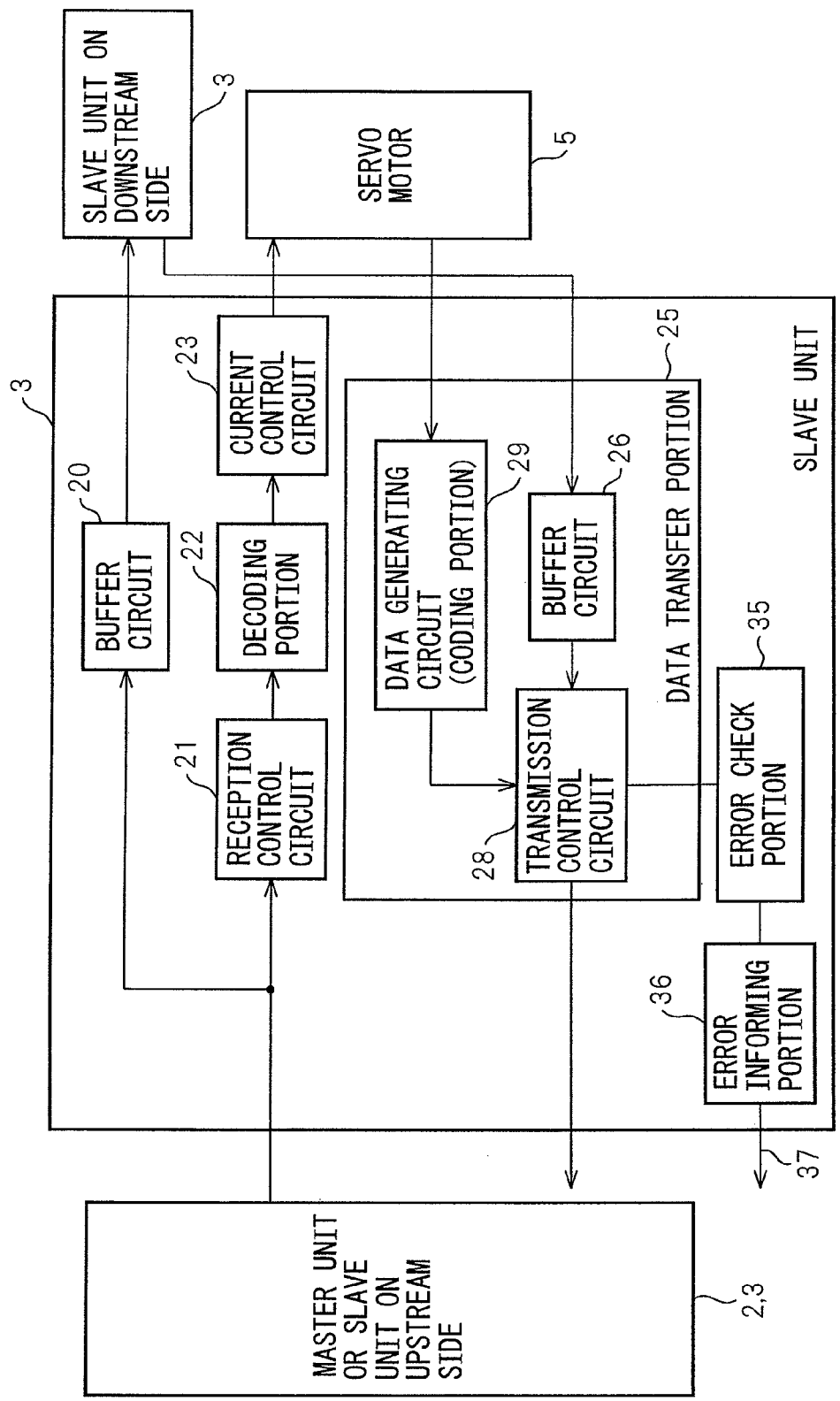
FIG. 3 is a view explaining the construction of a slave unit.

As shown in FIG. 3, the slave unit 3 comprises a first circuit portion for processing (relay processing) data transferred from the upstream side to the downstream side, and a second circuit portion for processing data transferred from the downstream side to the upstream side. In the first circuit portion, the control data transferred from the master unit 2 or the slave unit 3 on the upstream side branch point and flows via a buffer circuit 20 and an S/P converter (not shown) to the reception control circuit 21. The reception control circuit 21 is connected via a decoding portion 22 to a current control circuit 23. In the decoding portion 22, data is inspected by using error correction code, and when an error is detected, data received is dumped, and the value previously received correctly is used as it is, or data is corrected so as not to use the data having the detected error. In the current control circuit 23, a current command (torque command) is sent out to the servo motor 4 based on the inspected and corrected data. The buffer circuit 20 is connected to the serial bus 6 and passes the data received from the upstream side to the next slave unit 3 without performing an error check or error correction.

The second circuit portion comprises a data transfer portion 25, error check portion 35, and error informing portion 36. The data transfer portion 25 relays data with error check code transferred from the downstream side by adding a feedback signal from the servo motor 5 and signal data prepared from the information within the slave unit and without performing an error check on data transferred from the downstream side to the upstream side. Thus, in the data transfer portion 25, the control data transferred from the slave unit 3 on downstream side branch at the branch point to flow to the buffer circuit 26. The buffer circuit 26 includes a S/P converter (not shown) and is connected to the transmission control circuit 28, such that the data after signal conversion flows to the transmission control circuit 28. Thus, the total data of the slave unit 3 and the slave units 3 on the downstream side are transferred via the transmission control circuit 28 to the upstream side. Therefore, data with error check code or error correction code is transferred by the data transfer portion without performing an error check so that high speed data transfer is possible between a plurality of slave units 3 connected by a daisy chain system.

The error check portion 35 is a separate circuit provided in addition to aside from the data transfer portion 25 for checking the presence or absence of an error, and is connected to the transmission control circuit 28. Data with error check code flow from the transmission control circuit 28 without being subjected to error check into the error check portion 35, where the error check code is read in and error check is performed. The result of the error check is transmitted via the error informing portion 36 on a signal line 37 provided aside from the serial bus 6 to the master unit 2, where it is stored in a buffer domain (not shown) for the result of the error check to be displayed. If, for example, there is ample time for the serial bus to transmit the result of error check after high speed data transfer has been completed and before the next data is transferred, it is also possible to use the serial bus to transmit the result of error check of data to the master unit 2.

Although not shown, a similar error check portion is provided in the reception control circuit for data that flow from the upstream side to the downstream side, and as in the fourth embodiment, this error check portion is used to transmit and inform the result of error check of data that flow from the upstream side to the downstream side, to the master unit 2.

The error informing portion 36 are means with which the slave unit provided with the error check portion 35 informs the result of error check individually to the master unit 2. The master unit 2, upon reception of the notification, displays the slave unit in which an error has occurred on the display 17 (see FIG. 4) using the error displaying portion 16.

Figure 5:
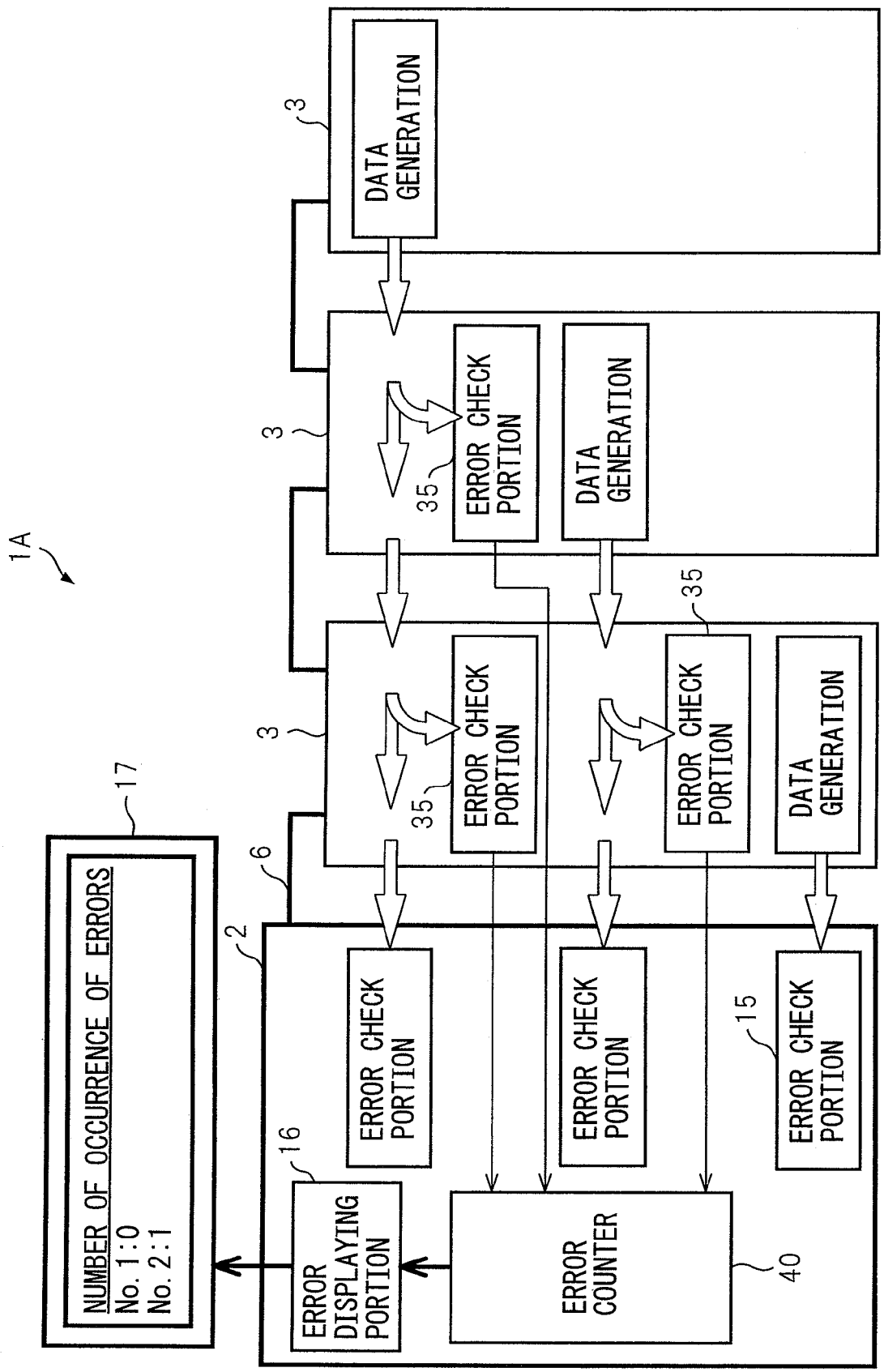
FIG. 5 is a schematic view of the construction of a data transfer apparatus according to a second embodiment of the present invention and the state of data flowing from downstream side to upstream side in the data transfer apparatus.

Next, a data transfer apparatus according to a second embodiment of the present invention will be described with reference to FIG. 5. The data transfer apparatus 1A according to this embodiment differs from that in the first embodiment in that an error counter 40 is provided in the master unit 2. The error counter 40 counts and stores the number of errors in individual slave units 3 connected to the master unit 2 by a daisy chain system. By providing such an error counter 40, it is possible to identify the slave unit 3 in which error has occurred when maintenance is to be performed on the machine tool or the robot having the master unit 2 and a plurality of slave units 3. Other constituents that are in common with the first embodiment are denoted by the same reference numerals and symbols, and duplicate explanation thereof will be omitted.

Figure 6:
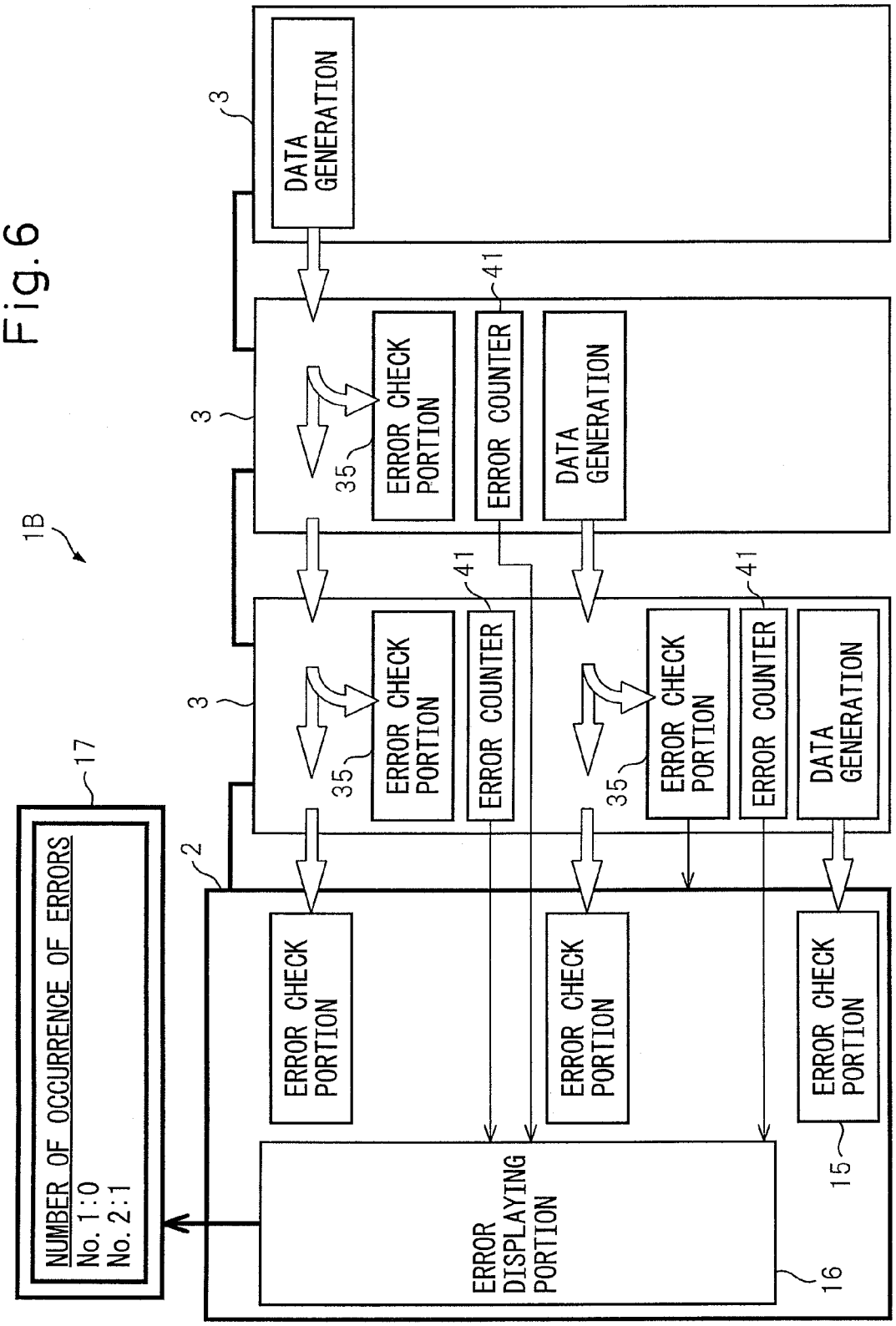
FIG. 6 is a schematic view of the construction of a data transfer apparatus according to a third embodiment of the present invention and the state of data flowing from downstream side to upstream side in the data transfer apparatus.

Next, a data transfer apparatus according to a third embodiment of the present invention will be described with reference to FIG. 6. The data transfer apparatus 1B according to this embodiment is the same as that in the second embodiment in that error counters 41 are provided, but differs from that in the second embodiment in that error counters are provided in the slave units 3 (except for the slave unit 3 on the utmost downstream side). By providing error counters 41 in the slave units 3. It is possible to identify the slave unit 3 in which an error has occurred.

Figure 7:
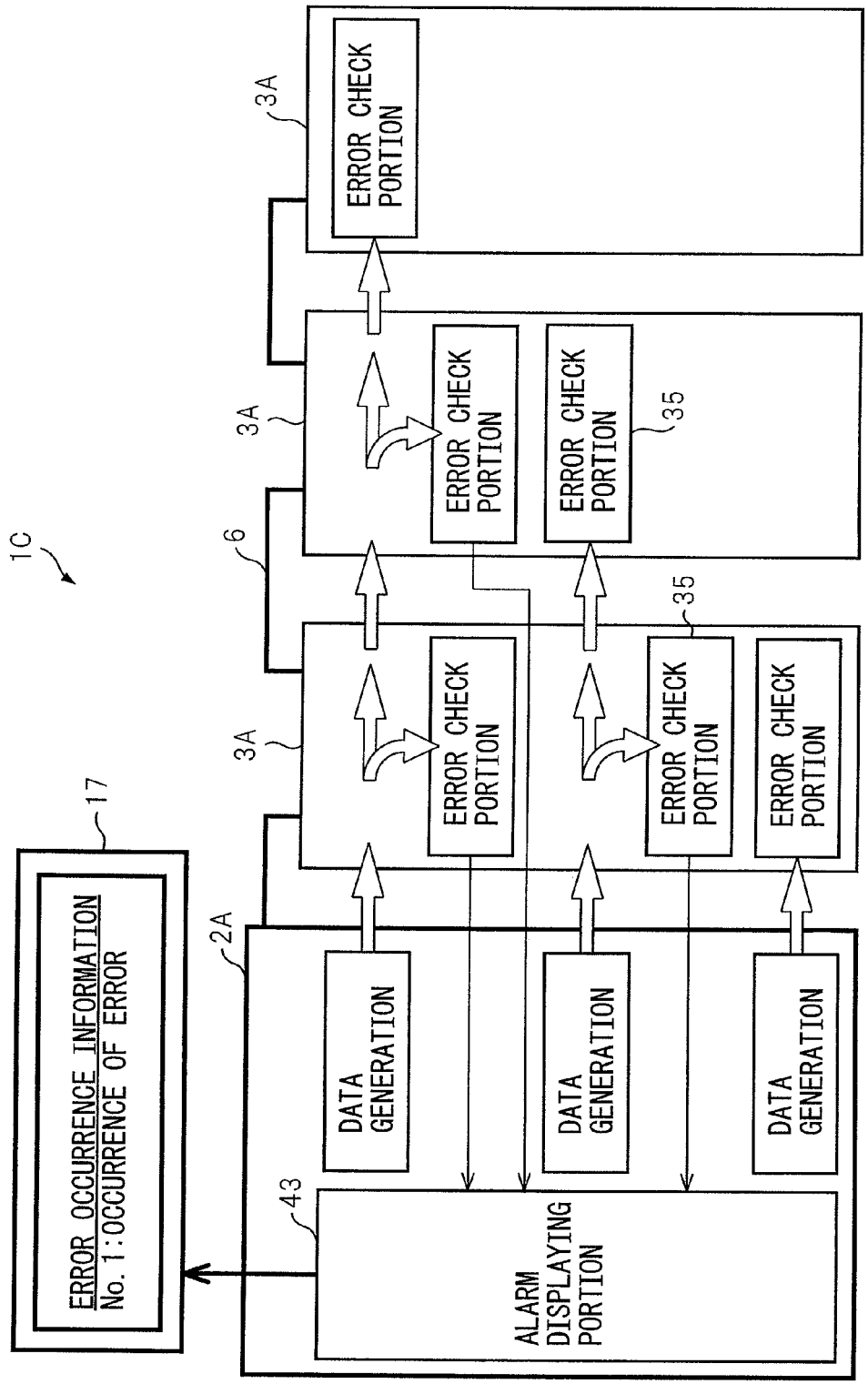
FIG. 7 is a schematic view of the construction of a data transfer apparatus according to a fourth embodiment of the present invention and the state of data flowing from upstream side to downstream side in the data transfer apparatus.
Figure 8:
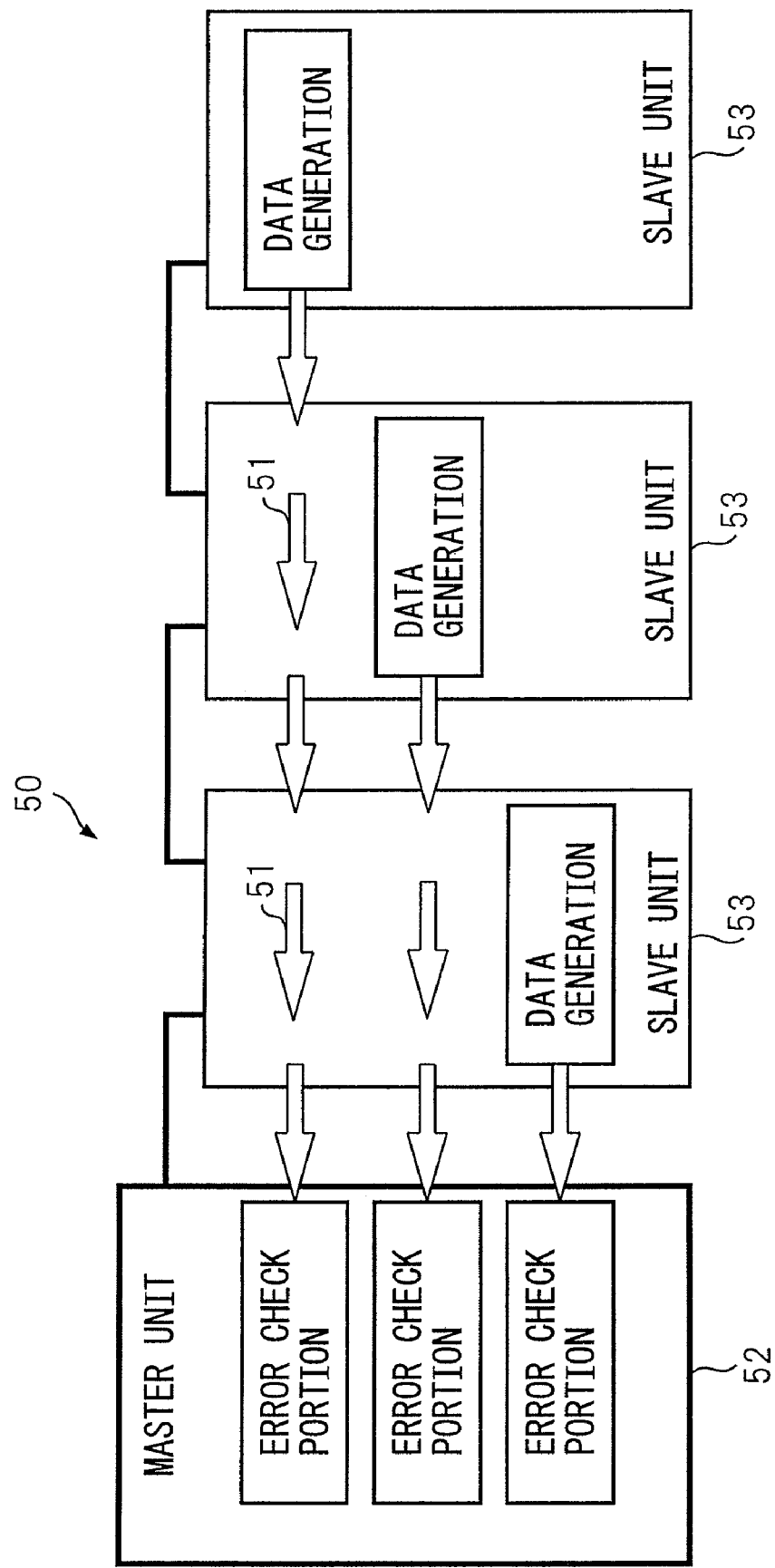
FIG. 8 is a view of the system construction of an example of prior art data transfer apparatus.

Next, a data transfer apparatus according to a fourth embodiment of the present invention will be described with reference to FIG. 7. The data transfer apparatus 1C according to this embodiment differs from that in the first embodiment in that data with error check code or error code flow from the upstream side to the downstream side and an alarm displaying portion 43 in place of an error displaying portion 16 is provided in the master unit 2A. Data is prepared by a transmit data generating circuit 12 (see FIG. 2) in the master unit 2A and transferred to the slave units 3A on the downstream side. In the data transfer portion 25 (see FIG. 1) in the slave units 3A, data branch into two at a branch point and flow into the buffer circuit and the reception control circuit, respectively.

One of the data that flows via the buffer circuit is transferred as it is to the slave units 3A without being subjected to error check or the like. The other data that flows via the reception control circuit is subjected to error check by an error check portion 35 (not shown), and the control data flow to the servo motor. The result of the error check by the error check portion 35 is sent via informing portion (not shown) to the master unit 2A. An alarm displaying portion 43 provided in place of the error displaying portion 16 in the first embodiment, displays an alarm when data error has occurred in a predetermined slave unit 3A. Other constituents are in common with the first embodiment, and therefore duplicate explanation will be omitted here.

As has been described above, in accordance with the above-described embodiments, the error check portion 35 is provided separately from the data transfer portion 25 in the slave units 3, 3A, so that the slave units 3, 3A in which an error has occurred can be identified without lowering the data transfer speed of data transferred from downstream side to upstream side, or from the upstream side to the downstream side, and maintenance on the machine tool or the robot can therefore be improved.

The present invention is by no means limited to above-described embodiments, but can be implemented in various modifications without departing from the scope of the invention.

What is claimed is:

1. A data transfer method for connecting a master unit on an upstream side and a plurality of slave units on a downstream side in series with a serial bus by a daisy chain system, and transferring data having an appended error check code or error correction code between a data transmitter and a data receiver, said data transfer method comprising:

transferring said data along said serial bus through a first circuit in at least one said slave unit, which is located between said data transmitter and said data receiver, from said data transmitter to said data receiver without performing an error check or error correction of said data;

performing said error check of said data by a second circuit provided in said at least one slave unit which is located between said data transmitter and said data receiver, wherein said second circuit is different from the first circuit through which said data flows; and informing a result of said error check, which includes information identifying the slave unit where an error occurred, to said master unit individually by said at least one slave unit which has performed said error check of said data.

2. A data transfer method according to claim 1, wherein said master unit displays said result of said error check.

3. A data transfer method according to claim 1, wherein said master unit counts a number of errors in individual slave units and displays said number of the errors.

4. A data transfer method according to claim 1, wherein an individual slave unit counts a number of errors which have occurred during a relay of said data and transmits said number of the errors to said master unit.

5. A data transfer apparatus in which a master unit on an upstream side and a plurality of slave units on a downstream side are connected in series with a serial bus by a daisy chain system, and data having an appended error check code or error correction code are transferred between a data transmitter and a data receiver, said apparatus comprising:

a data transfer portion in at least one said slave unit, which is located between said data transmitter and said data receiver, for transferring said data along said serial bus through said at least one slave unit from said data transmitter to said data receiver without performing an error check or error correction of said data;

an error check portion in said at least one slave unit, which is located between said data transmitter and said data receiver, for performing said error check of said data, wherein said error check portion is different from the data transfer portion through which said data flows; and an error informing portion in said at least one slave unit, which has said error check portion and which is located between said data transmitter and said data receiver, for informing a result of said error check, which includes information identifying the slave unit where an error occurred, individually to said master unit.

* * * * *